US008095831B2

(12) United States Patent
Moyer et al.

(10) Patent No.: US 8,095,831 B2
(45) Date of Patent: Jan. 10, 2012

(54) PROGRAMMABLE ERROR ACTIONS FOR A CACHE IN A DATA PROCESSING SYSTEM

(75) Inventors: William C. Moyer, Dripping Springs, TX (US); Gary L. Whisenhunt, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 255 days.

(21) Appl. No.: 12/273,155

(22) Filed: Nov. 18, 2008

(65) Prior Publication Data

US 2010/0125750 A1    May 20, 2010

(51) Int. Cl.
*G06F 11/00* (2006.01)
(52) U.S. Cl. .............................. 714/57; 714/49
(58) Field of Classification Search .............. 714/48, 714/49, 54, 57
See application file for complete search history.

(56) References Cited

U.S. PATENT DOCUMENTS

| | | | |
|---|---|---|---|
| 4,873,629 A * | 10/1989 | Harris et al. ................ 712/213 |
| 5,410,668 A * | 4/1995 | Hilton ........................ 711/139 |
| 6,014,756 A * | 1/2000 | Dottling et al. ............... 714/15 |
| 6,332,181 B1 | 12/2001 | Rossen et al. |
| 6,622,260 B1 * | 9/2003 | Marisetty et al. ............. 714/10 |
| 6,725,337 B1 | 4/2004 | Tan et al. |
| 6,901,540 B1 * | 5/2005 | Griffith et al. ................ 714/48 |
| 7,032,123 B2 | 4/2006 | Kane et al. |
| 7,240,277 B2 | 7/2007 | Anderson et al. |
| 7,328,391 B2 * | 2/2008 | Hart et al. .................... 714/753 |
| 7,634,638 B1 * | 12/2009 | Jensen ......................... 712/224 |
| 2003/0023932 A1 | 1/2003 | Arndt et al. |
| 2003/0188219 A1 | 10/2003 | DeRuiter et al. |
| 2005/0149781 A1 * | 7/2005 | Lempel et al. ................ 714/718 |
| 2006/0248314 A1 * | 11/2006 | Barlow et al. ................. 712/35 |
| 2007/0113158 A1 | 5/2007 | Fischer et al. |
| 2009/0204762 A1 * | 8/2009 | Huott et al. ................... 711/119 |

OTHER PUBLICATIONS

PCT Application No. PCT/US2009/062470 Search Report and Written Opinion, mailed Jun. 11, 2010.
U.S. Appl. No. 12/112,580, filed Apr. 30, 2008.
U.S. Appl. No. 12/205,210, filed Sep. 5, 2008.

* cited by examiner

*Primary Examiner* — Joshua Lohn
(74) *Attorney, Agent, or Firm* — Joanna G. Chiu; Robert L. King

(57) ABSTRACT

A data processing system and method of operation has a processor coupled to a cache. Cache control circuitry is coupled to the cache and performs error detection. A user programmable error action control register stores a control value for selecting a type of error action to be taken when a cache error is detected. A first value of the control value permits handling of a cache error that is transparent to the processor, and a second value permits handling of the cache error by taking an exception that is visible to the processor. Various alternate actions to a detected error, including error correction or cache line invalidation, may be taken in response to other values of the control value.

17 Claims, 6 Drawing Sheets

FIG. 3

| 0 | CEA | 0 | CECE | 0 | CEDT | 0 | CINV | CE |
|---|---|---|---|---|---|---|---|---|

| BITS | NAME | DESCRIPTION |
|---|---|---|
| 11:13 | CEA | CACHE ERROR ACTION<br>000 – ERROR DETECTION CAUSES MACHINE CHECK EXCEPTION. THE CONTENTS OF THE CACHE MAY BE EXAMINED BY SOFTWARE USING THE CACHE ARRAY ACCESS MECHANISMS.<br>001 – ERROR DETECTION CAUSES AUTO-INVALIDATION. NO MACHINE CHECK EXCEPTION IS GENERATED. THIS PROVIDES FOR TRANSPARENT OPERATION.<br>010 – ERROR DETECTION CAUSES MACHINE CHECK EXCEPTION AND AUTO-INVALIDATION. THIS ALLOWS FOR LOGGING THE OCCURRENCE OF AN ERROR AND ELIMINATES THE RECURRENCE OF THE SAME ERROR.<br>011 – ERROR DETECTION CAUSES AUTO-INVALIDATION IF THE LINE IS A CLEAN CACHE LINE. IF THE LINE IS A DIRTY CACHE LINE, ERROR DETECTION CAUSES A MACHINE CHECK EXCEPTION AND LEAVES THE LINE UNALTERED.<br>100 – ERROR DETECTION CAUSES AUTOMATIC CORRECTION. NO INVALIDATION, NO MACHINE CHECK EXCEPTION IS GENERATED. THIS PROVIDES THE MOST TRANSPARENCY OF ERROR OCCURRENCES.<br>101 – ERROR DETECTION CAUSES AUTOMATIC CORRECTION AND MACHINE CHECK EXCEPTION.<br>11X – RESERVED |
| 14 | – | RESERVED |
| 15 | CECE | CACHE ERROR CHECKING ENABLE<br>0 – ERROR CHECKING IS DISABLED<br>1 – ERROR CHECKING IS ENABLED |
| 16 | – | RESERVED |
| 17 | – | RESERVED |
| 18:19 | CEDT | CACHE ERROR DETECTION TYPE<br>00 – PARITY ERROR DETECTION IS SELECTED<br>01 – EDC ERROR DETECTION IS SELECTED<br>1X – RESERVED |
| 20:29 | – | RESERVED |

| BITS | NAME | DESCRIPTION |
|---|---|---|
| 30 | CINV | CACHE INVALIDATE<br>    0 - NO CACHE INVALIDATE<br>    1 - CACHE INVALIDATION OPERATION<br>WHEN WRITTEN TO A '1", A CACHE INVALIDATION OPERATION IS INITIATED BY HARDWARE. ONCE COMPLETE, THIS BIT IS RESET TO '0'. WRITING A '1' WHILE AN INVALIDATION OPERATION IS IN PROGRESS WILL RESULT IN AN UNDEFINED OPERATION. WRITING A '0' TO THIS BIT WHILE AN INVALIDATION OPERATION IS IN PROGRESS WILL BE IGNORED. CACHE INVALIDATION OPERATIONS OCCUR REGARDLESS OF THE ENABLE (CE) VALUE. |
| 31 | CE | CACHE ENABLE<br>    0 - CACHE IS DISABLED<br>    1 - CACHE IS ENABLED<br>WHEN DISABLED, CACHE LOOKUPS ARE NOT PERFORMED FOR PROCESSOR ACCESSES.<br>OTHER CACHE CONTROL OPERATIONS ARE STILL AVAILABLE. |

*FIG. 5*

PROGRAMMABLE ERROR ACTIONS FOR A CACHE IN A DATA PROCESSING SYSTEM

BACKGROUND

1. Field

This disclosure relates generally to data processing systems, and more specifically, to programmable error actions for a cache.

2. Related Art

Soft errors in caches are becoming increasingly problematic as dimensions are shrinking and as memory capacities are increasing. These soft errors involve changes to data stored in the cache, such as due to the impact of ionizing radiation. These changes result in less reliable caches which can be particularly problematic in safety-critical systems such as anti-lock braking systems, driver assistance systems, etc. That is, within such systems, high degrees or reliability may be required.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates, in diagrammatic form, an error action control register for use with the cache of FIG. 2 in accordance with one embodiment of the present invention.

FIGS. 4 and 5 illustrate, in table form, descriptions of various fields of the error action control register of FIG. 3, in accordance with one embodiment of the present invention.

DETAILED DESCRIPTION

Within a data processing system, upon detection of a soft error in a cache, different error actions may be taken. In one embodiment, cache control circuitry includes a user programmable control register which includes a cache error action (CEA) field for storing a control value which allows for the dynamic selection of an error action to be taken in response to a cache soft error being detected. For example, in one embodiment, a user may program the control value of the CEA field to allow for either a transparent operation or a non-transparent operation to be performed in response to a detected error. The use of the user programmable control register for selection of different error actions to be taken in response to detected errors provides a flexible mechanism to evaluate and overcome these soft errors. For example, in critical areas of execution, such as during execution of safety-critical applications, transparent repair of soft errors may be desired, while during the execution of other types of applications or in other modes, it may be desirable to intercept and report soft errors for improved monitoring. Therefore, the user programmable control register allows for the dynamic varying of the transparency of cache errors to the processor during operation of the data processing system.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
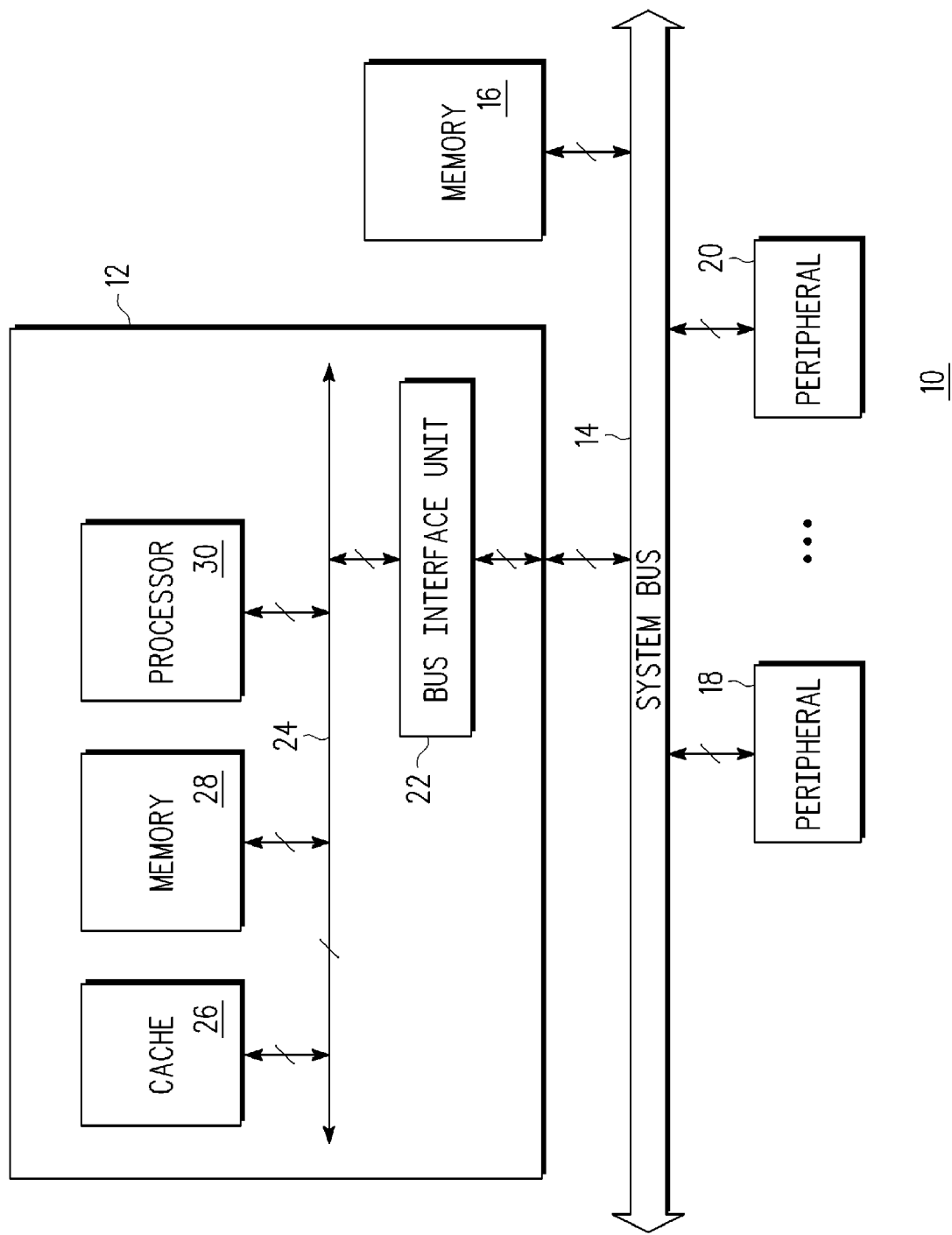
FIG. 1 illustrates in block diagram form a data processing system in accordance with one embodiment of the present invention.

FIG. 1 illustrates, in block diagram form, data processing system 10 in accordance with one embodiment of the present invention. Data processing system 10 includes a processing module 12, system bus 14, memory 16 and a plurality of peripherals such as a peripheral 18, peripheral 20 and, in some embodiments, additional peripherals as indicated by the dots in FIG. 1 separating peripheral 18 from peripheral 20. Memory 16 is a system memory that is coupled to system bus 14 by a bidirectional conductor that, in one form, has multiple conductors. In the illustrated form each of peripherals 18 and 20 is coupled to the system bus 14 by bidirectional multiple conductors as is processing module 12. Processing module 12 includes a bus interface unit 22 that is coupled to system bus 14 via a bidirectional bus having multiple conductors. Bus interface unit 22 is coupled to an internal bus 24 via bidirectional conductors. Internal bus 24 is a multiple-conductor communication bus. Coupled to internal bus 24 via respective bidirectional conductors is a cache 26, a memory 28, and a processor 30. Processor 30 implements data processing operations. Each of cache 26, memory 28, and processor 30 are coupled to the internal bus via respective bidirectional conductors. In one embodiment, processor 30 may be coupled directly to cache 26 rather than via internal bus 24. In yet another embodiment, processor 30 may be coupled directly via a dedicated interface in addition to being coupled via internal bus 24. Other embodiments may use different methods of coupling processor 30, cache 26, and memory 28. Alternatively, memory 28 may not be present in processing module 12. Note that memory 28 and memory 16 can be any type of memory, and peripherals 18 and 20 can each be any type of peripheral or device. In one embodiment, all of data processing system 10 is on a single integrated circuit. Alternatively, data processing system 10 can be implemented using more than one integrated circuit. In one embodiment, at least all of processing module 12 is on a single integrated circuit.

In operation, processing module 12 functions to implement a variety of data processing functions by executing a plurality of data processing instructions. Cache 26 is a temporary data store for frequently-used information that is needed by processor 30. In one embodiment, cache 26 is a set-associative cache. In one embodiment, cache 26 may be an instruction cache which stores instruction information. In another embodiment, cache 26 may be a data cache which stores data information (e.g. operand information). In yet another embodiment, cache 26 may be a unified cache capable of storing multiple types of information, such as both instruction information and data information (e.g. operand information). Information needed by processor 30 that is not within cache 26 is stored in memory 28 or memory 16. In one embodiment, memory 28 may be referred to as an internal memory where it is internal to processing module 12 while memory 16 may be referred to as an external memory where it is external to processing module 12. Bus interface unit 22 is only one of several interface units between processing module 12 and system bus 14. Bus interface unit 22 functions to coordinate the flow of information related to instruction execution by processor 30. Control information and data resulting from the execution of instructions are exchanged between processor 30 and system bus 14 via bus interface unit 22.

Note that processing module 12 and data processing system 10 may include any number of caches, which may include any type of cache, such as data caches, instruction caches, level one caches, level two caches, etc. The descriptions provided herein with respect to the error action control register and its use may apply to any cache within data processing system 10. In one embodiment, each cache or each of a subset of caches has its own error action control register or its own CEA field for selecting the error action to be taken upon a detected soft error. In another embodiment, one or more caches may share an error action control register or a CEA field within an error action control register.

Figure 2:
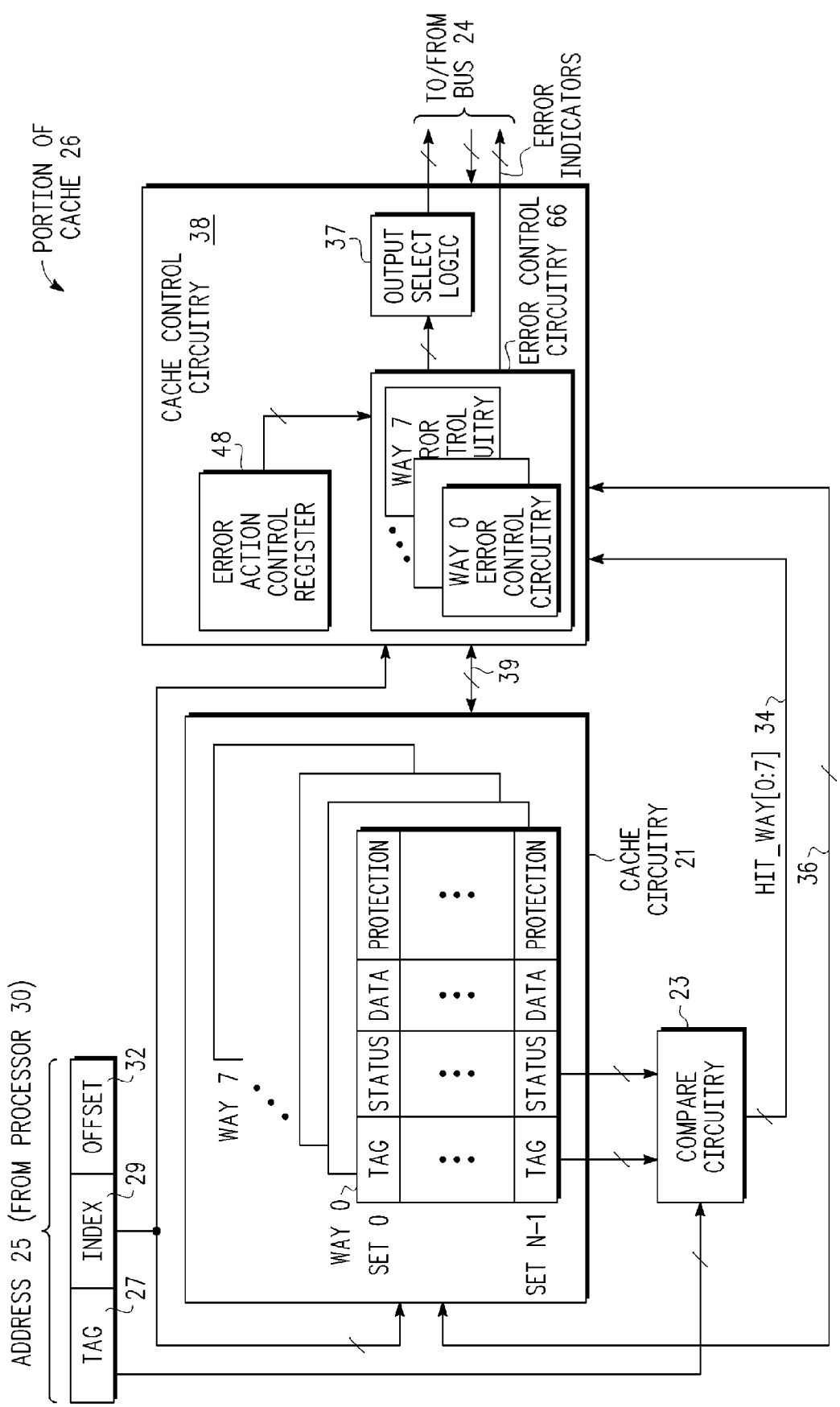
FIG. 2 illustrates in block diagram form a portion of a cache within the data processing system of FIG. 1 in accordance with one embodiment of the present invention.

FIG. 2 illustrates a portion of cache 26 of FIG. 1 in accordance with one embodiment. Alternate embodiments of cache 26 may use a different structure than that illustrated in FIG. 2. The portion of cache 26 illustrated in FIG. 2 has "N" sets and 8 ways, and may be referred to as a multi-way cache or as a multi-way set-associative cache. Therefore, cache 26 can be described as having N sets, each set having 8 ways. Cache 26, in alternate embodiments, may have any number of sets and any number of ways. Note that, as used herein, a cache line refers to an intersection of a cache way and a set. For example, way 0 includes N cache lines, each corresponding to one of set 0 to set N−1. Therefore, when a way is selected for replacement, the information in one or more cache lines (which is selected by index portion 29, as will be described below) is actually replaced. That is, the entire way may not be replaced, but only one or more particular lines.

In the illustrated embodiment, cache circuitry 21 is storage circuitry which stores information in each of a plurality of cache lines or entries. For example, cache circuitry 21 includes tag, status, cache data, and protection fields for the cache lines or entries. Address 25 is provided from processor 30. Address 25 includes a tag portion 27, an index portion 29, and an offset portion 32. Index portion 29 is provided to cache circuitry 21 which indicates a particular cache line (i.e. one of set 0 to set N−1). Compare circuitry 23 is coupled to receive tag portion 27 and is coupled to cache circuitry 21 to receive tag and status information. Based on this received information, compare circuitry 23 determines whether there has been a cache hit or a cache miss. In the illustrated embodiment, a plurality of hit/miss signals labeled HIT_WAY[0:7] 34 are provided to cache control circuitry 38. Each HIT_WAY[0:7] 34 signal indicates whether or not there has been a cache hit for its corresponding way in cache circuitry 21. Alternate embodiments may use a cache miss signal in addition to or instead of a cache hit signal.

Cache control circuitry 38 is coupled to cache circuitry 21 by way of conductors or signals 36 and 39. Address 25 from processor 30 including index portion 29 is also provided to the cache control circuitry 38 for indicating a particular cache line (i.e. one of set 0 to set N−1), as well as for providing tag 27 and offset 32 portions for other control operations. Cache control circuitry 38 includes an error action control register 48, output select logic 37, and error control circuitry 66. Error action control register 48 is coupled to error control circuitry 66, and error control circuitry is coupled to output select logic 37. Error control circuitry 66 also provides one or more error indicators to bus 24. Output select logic provides information to bus 24. Cache control circuitry 38 is also coupled to receive information from bus 24.

Error control circuitry 66 includes error control circuitry for each way of cache circuitry 21: way 0 error control circuitry-way 7 error control circuitry. Error control circuitry 66, as will be described in more detail below, performs error detection and selective error correction for cache 26. Cache control circuitry 38 may also include other circuitry to perform other cache functions, as should be well understood in the art, and therefore, this other circuitry will not be described in more detail herein.

Still referring to FIG. 2, index portion 29 is used to select a set in cache circuitry 21. The tag information from cache circuitry 21 is compared to tag 27 and qualified by status information (e.g. valid bits) from cache circuitry 21. The result of the compare and qualification (e.g. match and valid) determines whether or not a cache hit occurs. As described above, each HIT_WAY[0:7] 34 signal indicates whether or not there has been a cache hit for its corresponding way in cache circuitry 21.

In the case of a read access to cache 26, upon a cache hit, the cache data and protection fields of the cache line which resulted in the cache hit are provided, via conductors 39, to cache control circuitry 38. The corresponding error control circuitry within error control circuitry 66 for the way which resulted in the cache hit performs error detection and/or correction on the received cache data using the received protection information. The error detection and/or correction scheme used is selected using the settings within error action control register 48, as will be described in more detail below with respect to FIG. 6. Also, if an error is detected, the corresponding error control circuitry within error control circuitry 66 for the way which resulted in the cache hit uses the settings within error action control register 48 to determine an error action to be taken in response to the detected error, as will be described in more detail below. The cache data can then be provided to bus 24 via output select logic which, using HIT_WAY[0:7] 34, selects the output of the corresponding error control circuitry within error control circuitry 66 for the way which resulted in the cache hit. Note that if error correction is also being performed, then the corrected cache data will be output via output select logic 37 rather than the data provided from cache circuitry 21. Also, note that one or more error indicators can also be provided to bus 24 via output select logic 37 to indicate whether or not an error has occurred. Furthermore, if corrected cache data is being provided, the one or more error indicators may be negated to indicate that there is no error with the cache data being provided (since it has been corrected). In this case, the detected error is transparent to processor 30.

In the case of a write access to cache 26, upon a cache hit, information (e.g. the cache data for storage into cache circuitry 21) can be received from bus 24 by cache control circuitry 38. The cache data can be provided by cache control circuitry 38 for storage by merging the new data into the appropriate cache line of cache circuitry 21 via conductors 39. Also, cache control circuitry 38 can appropriately update the status field of the cache line. Status information may include status such as a valid (V) flag indicating the cache line is valid, and a dirty (D) flag indicating the cache line is modified with respect to the copy residing in memory 16 or memory 28. Other status flags may also be implemented as are known in the art. (Note that the specific circuitry used to receive the cache data and route it to the line within cache circuitry 21 which caused the hit and to update the status information is not illustrated, since it is well understood in the art.) The received cache data is also provided to error control circuitry 66 so that the corresponding error control circuitry within error control circuitry 66 (as selected by HIT_WAY[0:7] 34) can generate the appropriate updated protection information, as will be described in more detail with respect to FIG. 6 below. This corresponding protection information may also be provided, along with the received cache data, by cache control circuitry 38 for storage into the appropriate cache line of cache circuitry 21 which resulted in the cache line hit. Note that if error correction is also being performed, then the corrected received cache data (if an error was detected) will be provided for storage back into cache circuitry 21 along with the merged store data for the write access.

In the case of a cache miss, allocation logic (not shown) within cache control circuitry 38 identifies a cache line for replacement and updates the cache line. Any known method of cache allocation can be used to select a cache line for replacement, such as, for example, a round robin method, a pseudo-least recently used (PLRU) method, etc. Upon a cache miss, the new cache data for storage into the newly allocated cache line is provided to cache control circuitry 38 by bus 24. The new cache data can then be provided for storage into the newly allocated cache line of cache circuitry 21 via conductors 39. Also, cache control circuitry 38 can appropriately generate the status information for storage into the status field of the newly allocated cache line. (Note that the specific circuitry used to receive the cache data and route it to the newly allocated cache line within circuitry 21 and to generate the status information for the newly allocated cache line is not illustrated, since it is well understood in the art.) The new cache data is also provided to error control circuitry 66 so that the corresponding error control circuitry within error control circuitry 66 (corresponding to the way selected by replacement logic 49 which includes the newly allocated cache line) can generate the appropriate protection information, as will be described in more detail with respect to FIG. 6 below. This corresponding protection information may also be provided, along with the received cache data, by cache control circuitry 38 for storage into the newly allocated cache line of cache circuitry 21.

In the illustrated embodiment, cache control circuitry 38 also provides control signals 36 to cache circuitry 21 (e.g. for read/write control). For example, cache control circuitry 38 may, under control of processor 30, update cache circuitry 21. For example, processor 30 may execute special cache instructions to update status information. Also, in one embodiment, cache control circuitry 38, under control of processor 30, such as via special cache instructions or via move to special purpose register instruction, may update error action control register 48 to, for example, dynamically change the error action to be performed upon detection of an error. Although FIG. 2 illustrates specific circuitry that may be used to implement a portion of cache 26 of FIG. 1, alternate embodiments may use any desired circuitry. A wide variety of circuit implementations may be used. The circuitry illustrated in FIG. 2 is merely intended to illustrate one possible embodiment.

FIG. 3 illustrates, in diagrammatic form, one embodiment of error action control register 48 which includes a 3-bit cache error action (CEA) field, a 1-bit cache error checking enable (CECE) field, a 2-bit cache error detection type (CEDT) field, a 1-bit cache invalidate (CINV) field, and a 1-bit cache enable (CE) field. FIGS. 4 and 5 illustrate, in table form, descriptions for the fields of error action control register 48 illustrated in FIG. 3.

For example, CEA is a 3-bit field which indicates what error action is to be taken when a cache error is detected by error control circuitry 66. FIG. 4 illustrates one example of various encodings for the CEA field. In one embodiment, when the CEA field has a value of 000, an error detection causes a machine check exception which may then be handled by a software interrupt handler. For example, the contents of cache 26 may be examined by software using available cache array access mechanisms. For example, in one embodiment, access to the cache array may be made with a memory mapped access to the contents of the cache tag, status, protection and data portions of a cache line incurring an error. Alternatively, access to the cache array may be made through one or more test access registers or direct cache access control and data registers to obtain the state of a cache line. In this manner, detection of an error is reported to processor 30, causing a processor machine check exception or interrupt for software handling, and is thus non-transparent to processor 30. In one embodiment, the machine check exception is generated without modifying contents of the cache where the exception permits logging of the detected error and examination of the stored information within the cache to gather information about the detected error. Software may then log any desired statistics or other information regarding the type of error, or the relationship of the detected error to other states of data processing system 10. In one embodiment, following this, the software may perform one or more correction operations to allow for continued execution by the processor of the interrupted program.

In one embodiment, when the CEA field has a value of 001, an error detection causes an auto-invalidation operation, in which, for example, a cache line which resulted in the cache error is invalidated. In one embodiment, a cache line which resulted in the cache error is invalidated even if the cache line which resulted in the cache error did not result in the cache hit. This may be done by negating the valid bit of the status field of the cache line which resulted in the cache error. Also, no machine check exception is generated, thus providing for transparent operation in which this error action is transparent to processor 30. In this situation, in one embodiment, the invalidation of the cache line causes a cache miss to occur instead of a software exception being signaled, and the cache line may be refilled from memory 16 or memory 28, thus eliminating the soft error, and allowing for processing to proceed normally without an exception, resulting in transparent operation.

In one embodiment, when the CEA field has a value of 010, an error detection causes both a machine check exception and an auto-invalidation. This error action allows for the logging of the occurrence of an error through the machine check exception and, by invalidating the cache line which resulted in the cache error, eliminates the recurrence of the same error. Eliminating the reoccurrence of the error may prevent a situation in which the machine check exception handler incurs the same error, and becomes stuck in a loop. In one embodiment, this setting of the CEA field (which causes both a machine check exception and an auto-invalidation) is used as a mechanism to "re-execute" the instruction that had the error detected after the offending line (i.e. the cache line including the error) is invalidated. That is, in one embodiment, the effect of taking the machine check exception causes the instruction being executed to be suppressed, and the normal software return mechanism from the machine check exception causes the instruction to be re-executed after it has been invalidated. This may simplify some implementations of the pipeline, such as for accesses to a data cache which results in error detections so that the hardware does not have to figure out a special way to re-execute the instruction after the error has been detected.

In one embodiment, when the CEA field has a value of 011, error detection causes an auto-invalidation if the cache line is a clean cache line (where a clean cache line is a cache line that is coherent with memory, such as memory 28 or 16, and thus contains the same data as the corresponding location in memory). However, if the cache line is a dirty cache line (i.e. a modified cache line in which the cache line is not coherent with memory, and thus contains data that is modified with respect to the data stored at the corresponding location in memory 28 or 16), an error detection causes a machine check exception and the cache line is left unaltered. Note that in this case, if a dirty cache line is invalidated, memory coherency is lost since the corresponding memory location in memory 28 or 16 does not contain the most up to date data stored in the dirty cache line. In one embodiment, avoiding the invalidation of dirty lines allows the software error handler to attempt to reach a recoverable state for the cases where a dirty line encounters a soft error, but for the normal case of soft errors occurring on clean lines, operation proceeds in a transparent fashion.

In one embodiment, when the CEA field has a value of 100, an error detection causes automatic correction (such as through an error correction scheme). In this example, the error action includes no cache line invalidation, and no machine check exception is generated. This error action provides the most transparency of error occurrences. That is, this error action provides maximum transparency of the cache error to processor 30.

In one embodiment, when the CEA field has a value of 101, an error detection causes automatic correction (such as through an error correction scheme), and causes a machine check exception. In this manner, even though the error can be transparently corrected, visibility of the error is provided to processor 30 via the machine check exception.

In the illustrated embodiment, the values of 110 and 111 for the CEA field are reserved for possible future use. Therefore, it can be seen how the CEA field is able to provide varying levels of transparency of a cache error to processor 30. For example, in the embodiment of FIG. 4, the error actions which provide the most transparency are those associated with a CEA value of 001 or 110 in which auto-invalidation is performed or automatic correction is performed. In either of these situations, error detection is transparent to processor 30 where operation of processor 30 is not interrupted or disturbed as a result of the cache error. However, the error actions which include generating a machine check exception are non-transparent. These non-transparent actions may allow for logging or other software processing relating to error occurrences to be performed.

Still referring to FIG. 4, CECE is a 1-bit field which enables or disables cache error checking. For example, when the CECE field has a value of 0, error checking is disabled. For example, in this case, all of error control circuitry 66 may be disabled from performing any error detection and/or correction. For example, when the CECE field has a value of 1, error checking is enabled. In this case, error control circuitry 66 is enabled and operates according to the other settings in error action control registers 48, such as the CEA and CEDT fields. CEDT is a 2-bit field which indicates the type of cache error detection to be performed. For example, when the CEDT field has a value of 00, parity error detection (e.g. single-bit error detection) is selected and when the CEDT field has a value of 01, error detection code (EDC) error detection (e.g. multiple bit error detection) is selected. In the case of EDC, note that error correction code (ECC) operations may or may not be performed. For example, the settings of the CEA field will help determine whether or not error correction will be performed.

In FIG. 5, the CINV field is a 1-bit field which indicates whether a cache invalidate operation is to be performed. For example, when the CINV field has a value of 0, no cache invalidate is performed, but when the CINV field has a value of 1, a cache invalidation operation is performed. For example, when set to a "1", a cache invalidation operation is initiated by hardware. Once complete, this bit is reset to a "0". In one embodiment, writing a "1" while an invalidation operation is in progress will result in an undefined operation, and writing a "0" to this bit while an invalidation operation is in progress will be ignored. Also, in one embodiment, cache invalidation operations occur regardless of the value of the CE field.

Still referring to FIG. 5, the CE field is a 1-bit field which indicates whether the cache is enabled or not. For example, when the CE field has a value of 0, the cache is disabled and cache lookups are not performed for processor accesses. However, other cache control operations may still be available. When the CE field has a value of 1, the cache is enabled.

In alternate embodiments, error action control register 48 may include more or less fields, and each field may include more or less bits, as needed. Although one type of architecture for cache 26 has been illustrated in FIG. 2, alternate embodiments of cache 26 may use any desired or appropriate architecture. The architecture illustrated in FIG. 2 is merely intended to be one possible representative architecture. Any cache architecture that allows for the desired cache error actions may be used.

Figure 6:
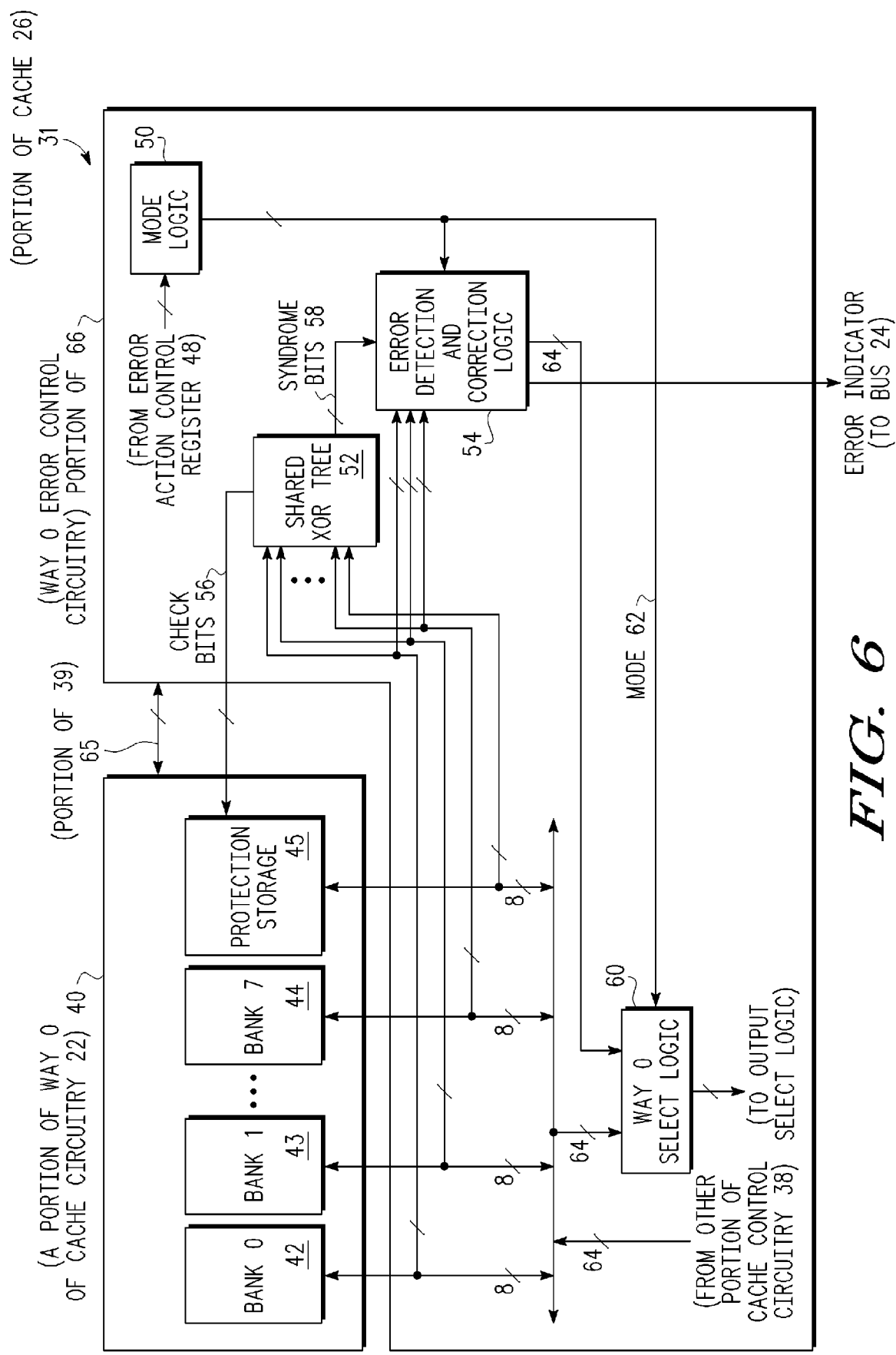
FIG. 6 illustrates in block diagram form, a portion of the cache of FIG. 2 in accordance with one embodiment of the present invention.

FIG. 6 illustrates circuitry 31, which represents a portion of cache 26 in accordance with one embodiment of the present invention. Circuitry 31 includes memory storage circuitry 40, which represents a portion of way 0 of cache circuitry 21. Memory storage circuitry 40 includes a number of memory banks and protection storage 45. In the illustrated embodiment, memory storage circuitry 40 includes 8 banks: bank 0 42, bank 1 43, ... bank 7 44. Alternate embodiments may include any number of banks. In the illustrated embodiment, banks 0-7 represent the cache data portion of way 0, where each bank is 1 byte wide, and protection storage 45 represents the protection portion of way 0. Each of banks 0-7 stores N bytes, one byte corresponding to each of sets 0 to N−1. Therefore, in the illustrated embodiment, having 8 banks, each cache data field of way 0 stores a doubleword. If each cache data field of way 0 were to store more than a doubleword, circuitry 40 would include more banks, or wider banks, as needed, and a larger protection storage, as needed. Note also that the description herein of FIG. 3 applies analogously to each of ways 0-7.

Circuitry 31 includes way 0 error control circuitry, which is a portion of error control circuitry 66. Way 0 error control circuitry is bidirectionally coupled to memory storage circuitry 40 (to the portion of way 0 of cache circuitry 21) and includes way 0 select logic 60, mode logic 50 (which is coupled to receive information from error action control register 48), a shared exclusive-OR (XOR) tree 52, and error detection and correction logic 54 (which is also coupled to receive information from error action control register 48). Mode logic 50, based on the value of the CEDT field of error action control register 48, outputs a mode indicator 62 to a control input of way 0 select logic 60. In one embodiment, mode 62 indicates what error detection mode circuitry 31 is operating in. For example, in the illustrated embodiment, based on the value of the CEDT control field in control register 48, mode 62 indicates whether circuitry 31 is operating in EDC mode (multi-bit error detection) or parity mode (single bit error detection). Note that, in one embodiment, mode indicator 62 is output based on the value of the CEDT control field when cache error checking is enabled (when the CECE field has a value of one). However, in one embodiment, when the CECE control field indicates that cache error checking is not enabled (when CECE field has a value of 0), then mode 62 is set such that way 0 select logic 60 selects the outputs from circuitry 40 rather than error detection and correction logic 54, and error detection and correction logic 54 may be disabled.

In EDC mode, each entry of protection storage 45 stores corresponding check bits for the corresponding entry within banks 0-7. For example, the first entry of protection storage 45 stores the check bits corresponding to the data stored in the first entry of each of banks 0-7. In parity mode, though, each entry of protection storage 45 stores a parity bit corresponding to an entry in each of banks 0-7. For example, in parity mode, the first entry of protection storage 45 stores a parity bit for the first entry in each of banks 0-7, Therefore, in the illustrated embodiment in which there are 8 banks, each entry of protection storage 45 stores 8 bits of parity, one for each of banks 0-7. In one embodiment, these same 8 bits are used to store checkbits 56 for the collective 64-bit data in banks 0-7 in EDC mode.

In EDC mode, shared XOR tree 52 is coupled to receive information from each of bank 0 through bank 7 and from protection storage 45. In EDC mode, shared XOR tree 52, based on information received from other portions of cache control circuitry 38 (which may come from bus 24), or from a particular entry in each of banks 0-7, or a combination of both, generates check bits 56 which are provided to protection storage 45 for storage in a corresponding entry. Also, in EDC mode, shared XOR tree 52, based on information received from a particular entry in each of banks 0-7 and corresponding check bits from protection storage 45, generates syndrome bits 58 which are provided to correction logic 54. In EDC mode, error detection and correction logic 54 also receives the information from the particular entry in each of banks 0-7 and uses the corresponding syndrome bits 58 to perform multi-bit error detection. If an error is detected, control circuitry 66 performs an error action as indicated by the CEA field of error action control register 48. If the CEA field indicates that automatic correction is to occur (such as when the CEA field has a value of 100 or 101), then error detection and correction logic 54 also corrects the received information and provide the corrected information from the particular entry of banks 0-7 to way 0 select logic 60. Therefore, way 0 select logic 60, based on the value of mode 62, either provides the output of correction logic 54 to output select logic 37 (if in EDC mode in which auto-correction is to be performed) or the output of one or more of banks 0-7 directly to output select logic 37 (if in EDC mode in which auto-correction is not to be performed, or in parity mode).

When a cache hit occurs in way 0, output select logic 37 selects the output of way 0 select logic 60 to provide to bus 24. Note that in parity mode, the corresponding parity bits may also be provided to output select logic 37 from protection storage 45. Also, error detection and correction logic 54 may provide an error indicator to bus 24 to indicate whether or not an error occurred. In one embodiment, other portions of the error action indicated by the value of the CEA field may be performed by other portions of error control circuitry 66, cache control circuitry 38, or processor 30 or combinations thereof. For example, based on the error indicator or in response to the error indicator, a machine check exception can be generated or an auto-invalidation can be performed, when each is indicated by the CEA field.

Therefore, for a cache hit read operation in parity mode, or when operating with EDC, select logic 60 provides the output of the accessed entry in one or more of banks 0-7, as well as the corresponding parity bits, to output select logic 37. For a cache hit read operation in ECC mode, select logic 60 provides the output of error detection and correction logic 54 to output select logic 37. For a cache hit write operation in parity mode or a cache allocation operation performed upon a cache miss in parity mode, the write data is provided directly to an entry in one or more of banks 0-7 which is addressed by the write operation access address. That is, a write may be performed to any number of banks in banks 0-7, and the corresponding parity bits in the corresponding entry of protection storage 45 also get updated on a per-bit basis after generation in shared XOR tree 52. In this manner, if only one bank is written to as a result of the write operation, then only one bit in the corresponding entry of protection storage 45 is updated. The updating of parity bits in parity mode may be performed by logic within control logic 66 (not shown) in a known manner.

For a full write operation in EDC mode, in which all of banks 0-7 are written to (i.e. in which the full cache data field is written to), a read-modify-write (RMW) operation need not be performed. In this manner, a full write operation (a write to all banks of memory storage circuitry 40) can be performed with one or a single access (e.g. in a single processor cycle or a single clock cycle). In this case, the write data is provided to each entry of banks 0-7 addressed by the full write operation access address. The write data is also provided to shared XOR tree 52 which generates the corresponding check bits and provides them via check bits 56 to protection storage 45 for storage in the corresponding entry. In one embodiment, shared XOR tree 52 is combinational logic where the generation and write back of the check bits can be completed in the same processor or clock cycle as the write of the write data to banks 0-7.

For a partial write operation in EDC mode, in which less than all of banks 0-7 is written to, a read-modify-write (RMW) is needed. Therefore, performing a write operation to less than all of banks 0-7 (i.e. to less than the full cache data field) requires multiple accesses (e.g. multiple processor cycles or clock cycles), and cannot be performed with a single access as is the case for a full write operation. Due to the complexity of implementing the read-modify-write operation, write operations to less than all banks 0-7 may not be supported in some embodiments.

Figure 7:
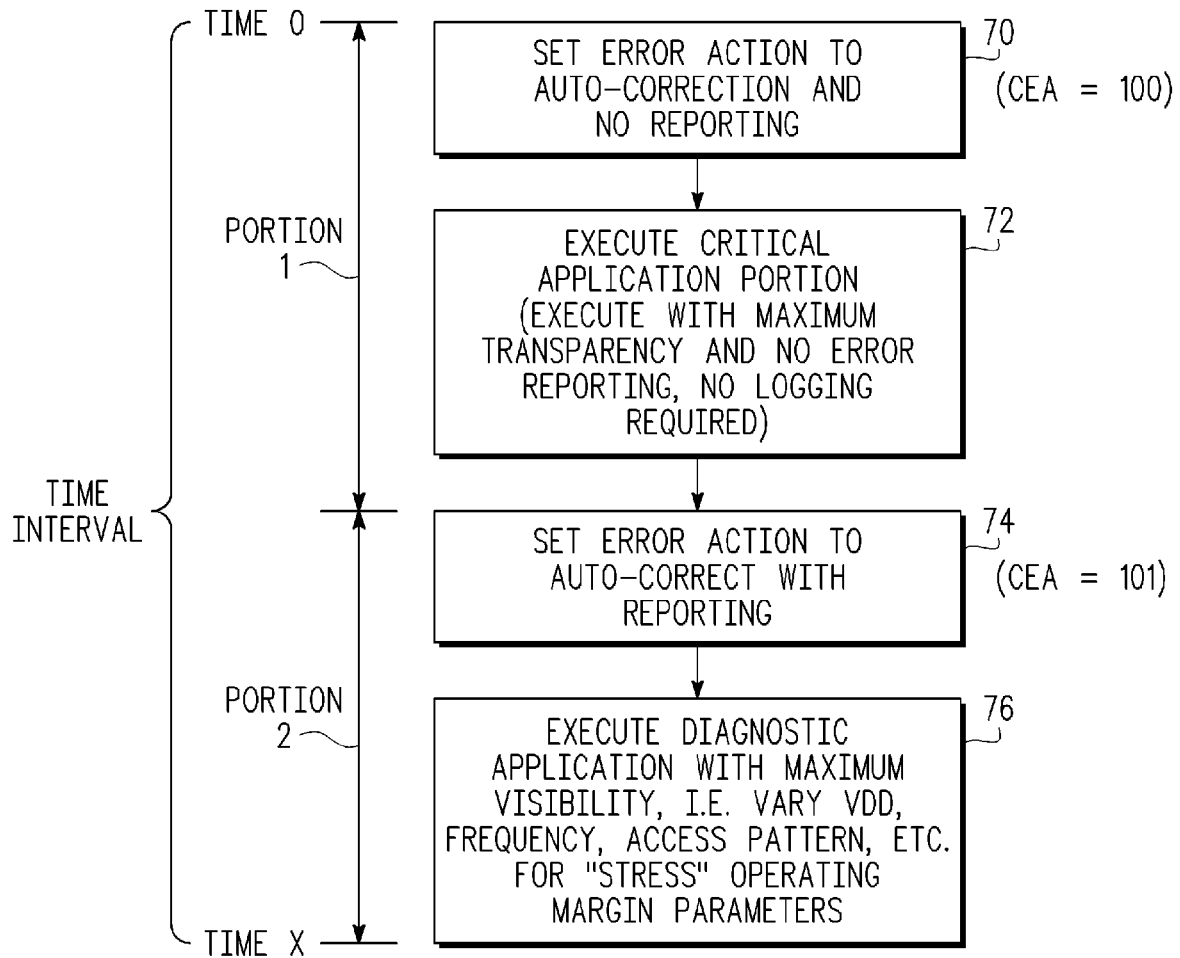
FIG. 7 illustrates, in flow diagram form, a method for operating the data processing system of FIG. 1 in accordance with one embodiment of the present invention.

FIG. 7 illustrates, in flow diagram form, a method for operating data processing system 10 of FIG. 1 in accordance with one embodiment of the present invention. The method begins with block 70 in the error action is set to perform auto-correction and no reporting (with respect to the examples of the CEA field provided above with respect to FIG. 4, the CEA field may be set to a control value of 100 in block 70). Then flow proceeds to block 72 in which a critical application portion is executed. This critical application portion is executed with maximum transparency since no error is reported (e.g. no machine check exception is generated) and no logging of the error is required. In this manner, the error detection and correction functions are transparent to processor 30. Flow then proceeds to block 74, where, the error action is set to perform auto-correction with reporting (with respect to the examples of the CEA field provided above with respect to FIG. 4, the CEA field may be set to a control value of 101 in block 74). Then flow proceeds to block 76 in which a diagnostic application with maximum visibility (i.e. minimum transparency) is executed. In this case, due to the minimum transparency, errors are corrected but processor 30 is notified when such errors occur through, for example, generation of a machine check exception. For example, in one embodiment, the diagnostic application may stress operating margin parameters by varying the supply voltage (VDD), frequency, access patterns, etc. Therefore, by dynamically changing the value of the CEA field, various levels of transparency (i.e. various levels of visibility to processor 30) can be achieved for different types of applications. For example, in one embodiment, a time interval may be defined which has a first portion (from time 0 to an intermediate time) and a second portion (from the intermediate time to time X), as illustrated along the left side of the flow diagram of FIG. 7. In one embodiment, this time interval may be repeated such that, each time the time interval is repeated, a critical application portion is executed during a first portion of the time interval with minimal visibility and maximum transparency and a diagnostic application is executed during a second portion of the time interval with maximum visibility and minimal transparency. Therefore, the settings of the CEA field can be used to allow changes in transparency and error actions between different types of applications within a particular interval of time, which may then be repeated.

By now it should be appreciated that there has been provided a method of varying the levels of transparency to processor 30 by dynamically changing the error action to be performed in response to detection of an soft error in a cache. This may be accomplished, for example, through the use of a user programmable control field within a register, such as the CEA field, which may be modified, as needed, to alter the error action taken. The error actions may be altered, for example, before different types of applications are executed so that different types of applications involve different levels of transparency upon detection of soft errors in the cache. Therefore, the use of a control field such as the CEA field may allow for a flexible mechanism to evaluate and overcome soft errors.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processing module 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 16 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, the number of bits used in the address fields may be modified based upon system requirements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a data processing system which includes a processor, a cache coupled to the processor, and cache control circuitry coupled to the cache. The cache control circuitry further includes a user programmable error action control register for storing a control value for selecting one of a plurality of error actions to be taken when a cache error is detected, wherein a first value of the control value selected by a user implements an automatic invalidation of a cache line containing the cache error without an exception being taken, and a second value of the control value selected by the user implements an automatic invalidation of a cache line containing the cache error with an exception being taken, and wherein the user dynamically programs the control value which determines whether error action to be taken is a transparent operation or a non-transparent operation. Item 2 includes the data processing system of item 1 wherein a third value of the control value within the user programmable error action control register generates an exception without modifying contents of the cache, the exception permitting logging of the detected error and examination of stored information within the cache to gather information about the detected error. Item 3 includes the data processing system of item 1 wherein a third value of the control value within the user programmable error action control register implements automatic correction of the detected error without invalidation of information associated with the detected error and without generating an exception. Item 4 includes the data processing system of item 1 wherein a third value of the control value within the user programmable error action control register implements automatic correction of the detected error and generates an exception. Item 5 includes the data processing system of item 1 wherein when the control value is set to the first value during a first portion of a time interval a first portion of an application is executed with transparency of cache errors to the processor, and when the control value is set to the second value during a second portion of the time interval wherein a second portion of the application is executed with cache errors being visible to the processor. Item 6 includes the data processing system of item 1 wherein a third value of the control value within the user programmable error action control register implements an automatic invalidation of the cache line containing the cache error if the cache line is a clean cache line, and if the cache line is a dirty cache line an exception is generated and the cache line is left unaltered. Item 7 includes the data processing system of item 1 wherein the user programmable error action control register further includes a second control value, the second control value controlling enablement of the error detection of the cache control circuitry.

Item 8 includes a method which includes coupling a processor to a cache, coupling cache control circuitry to the cache for performing error detection of information within the cache, and coupling a user programmable error action control register to the cache control circuitry. The user programmable error action control register stores a control value for selecting one of a plurality of error actions to be taken when a cache error is detected, wherein a first value of the control value selected by a user implements an automatic invalidation of a cache line containing the cache error without an exception being taken, and a second value of the control value selected by the user implements an automatic invalidation of a cache line containing the cache error with an exception being taken, and wherein the user dynamically programs the control value which determines whether error action to be taken is a transparent operation or a non-transparent operation. Item 9 includes the method of item 8 and further includes assigning a third value of the control value within the user programmable error action control register to generate an exception without modifying contents of the cache, the exception permitting logging of the detected error and examination of stored information within the cache to gather information about the detected error. Item 10 includes the method of item 8 and further includes assigning a third value of the control value within the user programmable error action control register to implement automatic correction of the detected error without invalidation of information associated with the detected error and without generating an exception. Item 11 includes the method of item 8 and further includes assigning a third value of the control value within the user programmable error action control register to implement automatic correction of the detected error and generates an exception. Item 12 includes the method of item 8 and further includes setting the control value to the first value during a first portion of a time interval wherein a first portion of an application is executed with transparency of cache errors to the processor, and setting the control value to the second value during a second portion of the time interval wherein a second portion of the application is executed with cache errors being visible to the processor. Item 13 includes the method of item 8 and further includes providing a second control value in the user programmable error action control register, the second control value controlling enablement of the error detection of the cache control circuitry. Item 14 includes the method of item 8 and further includes assigning a third value of the control value within the user programmable error action control register to implement an automatic invalidation of the cache line containing the cache error if the cache line is a clean cache line, and if the cache line is a dirty cache line an exception is generated and the cache line is left unaltered.

Item 15 includes a data processing system which includes a processor, a cache coupled to the processor, and cache control circuitry coupled to the cache. The cache control circuitry performs error detection and further includes a user programmable error action control register for storing a control value for selecting a type of error action to be taken when a cache error is detected. Item 16 includes the data processing system of item 15 wherein the control value of the programmable error action control register further includes a first value that permits handling of a cache error that is transparent to the processor and a second value that permits handling of the cache error by taking an exception that is visible to the processor. Item 17 includes the data processing system of item 16 wherein a third value of the control value within the user programmable error action control register generates an exception without modifying contents of the cache, the exception permitting logging of the detected error and examination of stored information within the cache to gather information about the detected error. Item 18 includes the data processing system of item 16 wherein a third value of the control value within the user programmable error action control register implements automatic correction of the detected error without invalidation of information associated with the detected error and without generating an exception. Item 19 includes the data processing system of item 16 wherein a third value of the control value within the user programmable error action control register implements automatic correction of the detected error and generates an exception. Item 20 includes the data processing system of item 16 wherein the control value is set to the first value during a first portion of a time interval wherein a first portion of an application is executed with transparency of cache errors to the processor, and the control value is set to the second value during a second portion of the time interval wherein a second portion of the application is executed with cache errors being visible to the processor.

What is claimed is:

1. A data processing system, comprising:
   a processor;
   a cache coupled to the processor; and
   cache control circuitry coupled to the cache, the cache control circuitry performing error detection, the cache control circuitry further comprising a user programmable error action control register for storing a control value for selecting one of a plurality of error actions to be taken when a cache error is detected, wherein a first value of the control value selected by a user implements an automatic invalidation of a cache line containing the cache error without an exception being taken regardless of whether the cache line is dirty or clean, and a second value of the control value selected by the user implements an automatic invalidation of a cache line containing the cache error with an exception being taken regardless of whether the cache line is dirty or clean, wherein the user dynamically programs the control value which determines whether error action to be taken is a transparent operation or a non-transparent operation.

2. The data processing system of claim 1 wherein a third value of the control value within the user programmable error action control register generates an exception without modifying contents of the cache, the exception permitting logging of the detected error and examination of stored information within the cache to gather information about the detected error.

3. The data processing system of claim 1 wherein a third value of the control value within the user programmable error action control register implements automatic correction of the detected error without invalidation of information associated with the detected error and without generating an exception.

4. The data processing system of claim 1 wherein a third value of the control value within the user programmable error action control register implements automatic correction of the detected error and generates an exception, wherein the cache control circuitry implements automatic correction by performing an error correction code (ECC) operation on the cache line containing the cache error to correct the cache error and outputting the corrected cache line from the cache.

5. The data processing system of claim 4 wherein a fourth value of the control value within the user programmable error action control register implements an automatic invalidation of the cache line containing the cache error if the cache line is a clean cache line, and if the cache line is a dirty cache line an exception is generated and the cache line is left unaltered such that the cache line is not invalidated.

6. The data processing system of claim 5 wherein a fifth value of the control value within the user programmable error action control register implements automatic correction of the detected error without invalidation of information associated with the detected error and without generating an exception, wherein the cache control circuitry implements automatic correction by performing an error correction code (ECC) operation on the cache line containing the cache error to correct the cache error and outputting the corrected cache line from the cache.

7. The data processing system of claim 1 wherein when the control value is set to the first value during a first portion of a time interval a first portion of an application is executed with transparency of cache errors to the processor, and when the control value is set to the second value during a second portion of the time interval wherein a second portion of the application is executed with cache errors being visible to the processor.

8. The data processing system of claim 1 wherein a third value of the control value within the user programmable error action control register implements an automatic invalidation of the cache line containing the cache error if the cache line is a clean cache line, and if the cache line is a dirty cache line an exception is generated and the cache line is left unaltered such that the cache line is not invalidated.

9. The data processing system of claim 1 wherein the user programmable error action control register further comprises a second control value, the second control value controlling enablement of the error detection of the cache control circuitry.

10. The data processing system of claim 1, wherein when the control value has the second value, a current instruction being executed is suppressed and after automatic invalidation of the cache line and after processing the taken exception, the current instruction that was suppressed is re-executed.

11. A method comprising:

coupling a processor to a cache;

coupling cache control circuitry to the cache for performing error detection of information within the cache; and coupling a user programmable error action control register to the cache control circuitry, the user programmable error action control register storing a control value for selecting one of a plurality of error actions to be taken when a cache error is detected, wherein a first value of the control value selected by a user implements an automatic invalidation of a cache line containing the cache error without an exception being taken regardless of whether the cache line is dirty or clean, and a second value of the control value selected by the user implements an automatic invalidation of a cache line containing the cache error with an exception being taken regardless of whether the cache line is dirty or clean, wherein the user dynamically programs the control value which determines whether error action to be taken is a transparent operation or a non-transparent operation.

12. The method of claim 11 further comprising:

assigning a third value of the control value within the user programmable error action control register to generate an exception without modifying contents of the cache, the exception permitting logging of the detected error and examination of stored information within the cache to gather information about the detected error.

13. The method of claim 11 further comprising:

assigning a third value of the control value within the user programmable error action control register to implement automatic correction of the detected error without invalidation of information associated with the detected error and without generating an exception, wherein implementing the automatic correction comprises performing an error correction code (ECC) operation on the cache line containing the cache error to correct the cache error and outputting the corrected cache line from the cache.

14. The method of claim 11 further comprising:

assigning a third value of the control value within the user programmable error action control register to implement automatic correction of the detected error and generates an exception.

15. The method of claim 11 further comprising:

setting the control value to the first value during a first portion of a time interval wherein a first portion of an application is executed with transparency of cache errors to the processor; and setting the control value to the second value during a second portion of the time interval wherein a second portion of the application is executed with cache errors being visible to the processor.

16. The method of claim 11 further comprising:

providing a second control value in the user programmable error action control register, the second control value controlling enablement of the error detection of the cache control circuitry.

17. The method of claim 11 further comprising:

assigning a third value of the control value within the user programmable error action control register to implement an automatic invalidation of the cache line containing the cache error if the cache line is a clean cache line, and if the cache line is a dirty cache line an exception is generated and the cache line is left unaltered such that the cache line is not invalidated.

* * * * *